(12) United States Patent
Taguchi et al.

(10) Patent No.: US 12,511,933 B2
(45) Date of Patent: Dec. 30, 2025

(54) OCCUPANT MONITORING SYSTEM

(71) Applicant: DENSO CORPORATION, Kariya (JP)

(72) Inventors: Kiyotaka Taguchi, Kariya (JP);
Yasuhiko Joho, Kariya (JP); Akira Kamiya, Kariya (JP); Hiroyuki Mimura, Kariya (JP); Toshinori Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 18/464,988

(22) Filed: Sep. 11, 2023

(65) Prior Publication Data

US 2023/0419692 A1 Dec. 28, 2023

Related U.S. Application Data

(63) Continuation of application No. PCT/JP2022/013561, filed on Mar. 23, 2022.

(30) Foreign Application Priority Data

Apr. 14, 2021 (JP) .................. 2021-068431

(51) Int. Cl.
*G06V 40/16* (2022.01)
*B60R 11/04* (2006.01)
*G06V 20/59* (2022.01)

(52) U.S. Cl.
CPC ............ *G06V 40/166* (2022.01); *B60R 11/04* (2013.01); *G06V 20/597* (2022.01)

(58) Field of Classification Search
CPC .... G06V 20/59–597; G06V 40/16–179; B60R 11/04
See application file for complete search history.

(56) References Cited

U.S. PATENT DOCUMENTS

2020/0097744 A1* 3/2020 Nakamura ........ B60R 21/01538
2020/0104571 A1 4/2020 Osuga et al.
2020/0143560 A1* 5/2020 Lu .................. B60W 40/08

FOREIGN PATENT DOCUMENTS

JP 2012044404 A 3/2012
JP 2020052827 A 4/2020

* cited by examiner

*Primary Examiner* — Casey L Kretzer
(74) *Attorney, Agent, or Firm* — Harness, Dickey & Pierce, P.L.C.

(57) ABSTRACT

An occupant monitoring system includes a camera, an image processor and an exclusion structure. The camera is provided in a cabin and configured to capture an image of a face of an occupant in a vehicle. The image processor is configured to recognize the face of the occupant based on an imaging data captured by the camera. The exclusion structure is configured to exclude, from a field of view of the camera or the imaging data, a region contains an obstacle to be erroneously recognized as the face of the occupant.

6 Claims, 8 Drawing Sheets

OCCUPANT MONITORING SYSTEM

CROSS REFERENCE TO RELATED APPLICATIONS

The present application is a continuation application of International Patent Application No. PCT/JP2022/013561 filed on Mar. 23, 2022, which designated the U.S. and claims the benefit of priority from Japanese Patent Application No. 2021-68431 filed on Apr. 14, 2021. The entire disclosures of all of the above applications are incorporated herein by reference.

TECHNICAL FIELD

The present disclosure relates to an occupant monitoring system.

BACKGROUND

In recent years, an automobile is equipped with an occupant monitoring system that captures an image of an occupant's face with a camera and recognizes the occupant's face from the captured image data.

SUMMARY

In an aspect of the present disclosure, an occupant monitoring system includes: a camera provided in a cabin to capture an image of a face of an occupant in a vehicle; an image processor configured to recognize the face of the occupant based on an imaging data captured by the camera; and an exclusion structure configured to exclude, from a field of view of the camera or the imaging data, a region contains an obstacle to be erroneously recognized as the face of the occupant.

DETAILED DESCRIPTION

Figure 1:
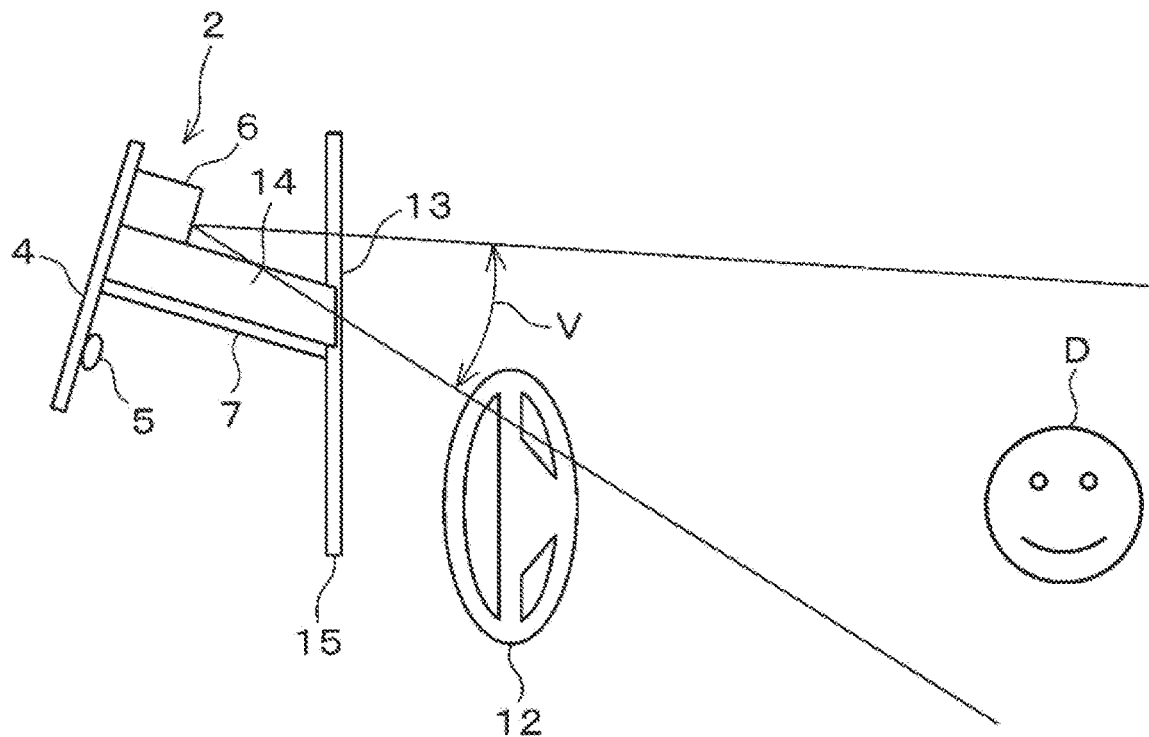
FIG. 1 is a plan view illustrating a camera unit according to a first embodiment.

In recent years, a vehicle such as an automobile is equipped with an occupant monitoring system that captures an image of an occupant's face with a camera and recognizes the occupant's face from the captured image data. The occupant monitoring system includes a camera unit having a camera and a light source, for example, in an instrument panel, so as to capture an image of the face of the driver. As a result, the driver or the state of the driver is determined and used for, for example, driving assistance. In an image recognition technology for determining a face of an occupant from image data, plural feature points such as eyes or/and mouth are detected and recognized as a face.

However, when the face of a person is determined based on the detection of the feature points as described above, an object other than the face may be erroneously determined to be the face of the person. For example, a steering wheel is present in front of the face of the driver, and the driver grips the steering wheel with the hand. The hand may be erroneously determined to be the face, depending on the distance between the fingers of the hand gripping the steering wheel, the protrusion or the gap of the joints of the hand, or the size of the fist. In this case, it is conceivable to shift the arrangement position of the camera from the steering wheel. However, this causes an issue that the face of another occupant in the rear seat is captured in the camera.

The present disclosure provides an occupant monitoring system that captures an image of a face of an occupant with a camera and recognizes the face of the occupant from the captured image data, in which erroneous recognition can be effectively restricted. In other words, an object other than the face of the occupant is restricted from being determined as the face.

In a first aspect of the present disclosure, an occupant monitoring system includes: a camera provided in a vehicle cabin to capture an image of a face of an occupant in a vehicle; an image processing unit configured to recognize the face of the occupant from imaging data of the camera; and an exclusion structure configured to exclude a region in which an obstacle that may be erroneously recognized as the face of the occupant is present from a field of view of the camera or the imaging data.

Examples of the obstacle that may be erroneously recognized as the face of the occupant include interior parts such as a steering wheel and lights, a metal fitting of a seat belt, an ornament installed by the occupant, particularly a round ornament, and the face of a child leaning from the rear seat toward the driver's seat.

Accordingly, when the face of the occupant in the vehicle is captured by the camera, the face of the occupant is recognized by the image processor based on the captured image data. At this time, the exclusion structure can exclude a region in which an obstacle that may be erroneously recognized as the face of the occupant is present from the field of view of the camera. Alternatively, a region in which an obstacle that may be erroneously recognized as the face of the occupant is present is excluded from the imaging data. Accordingly, it is possible to effectively restrict erroneous recognition in which an object other than the face of the occupant is determined as the face.

Hereinafter, some embodiments of the present disclosure will be described with reference to the drawings. In the embodiments, elements corresponding to those which have been described in the preceding embodiments are denoted by the same reference numerals, and redundant description may be omitted. In each of the embodiments described below, the occupant monitoring system is installed in a vehicle such as automobile, and is provided as a device that detects a driver as an occupant and monitors a state of the driver, for example, a face orientation, an eye open state, or the like.

First Embodiment

Figure 4:
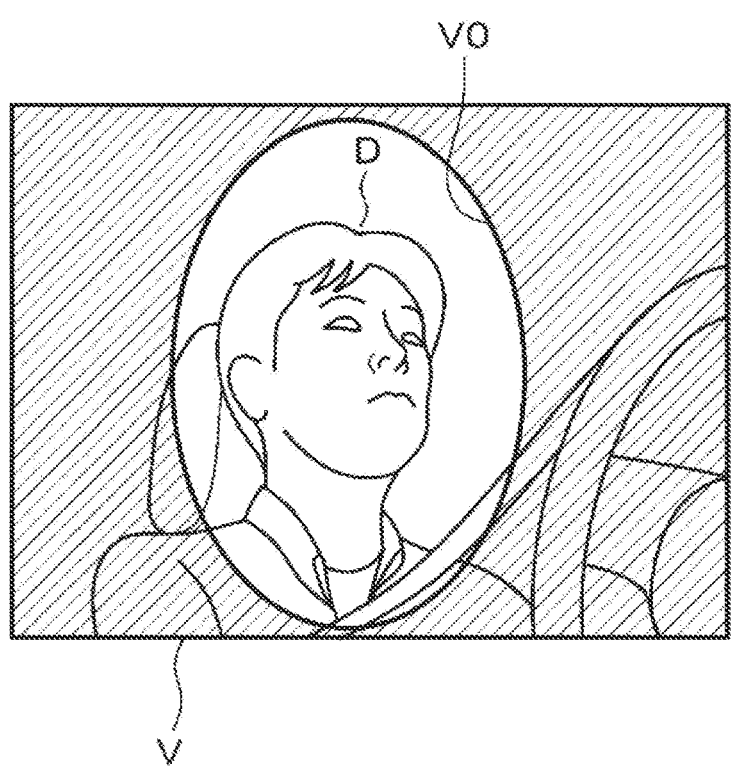
FIG. 4 is a diagram illustrating an example of imaging by a camera.
Figure 5:
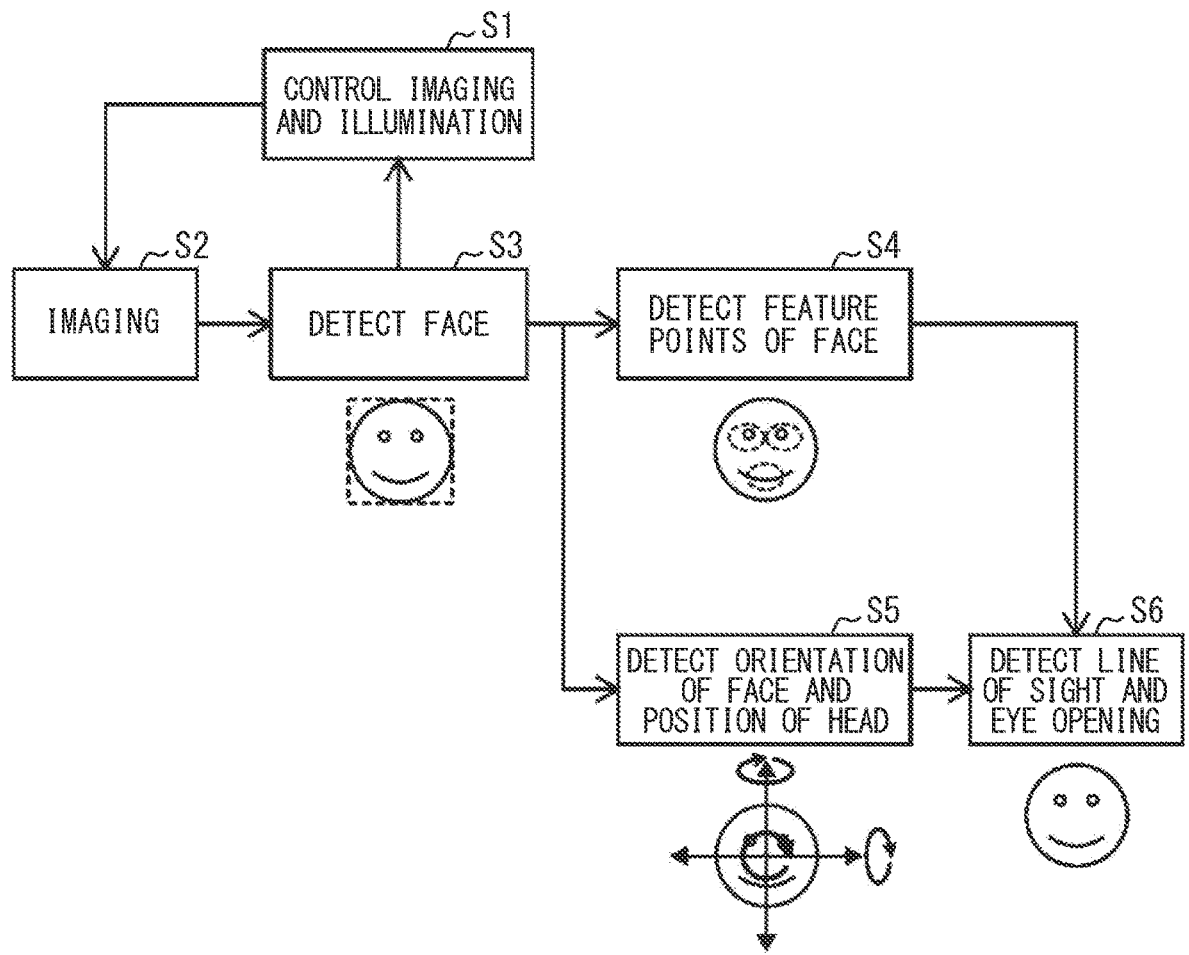
FIG. 5 is a flowchart illustrating a procedure of image recognition.
Figure 6:
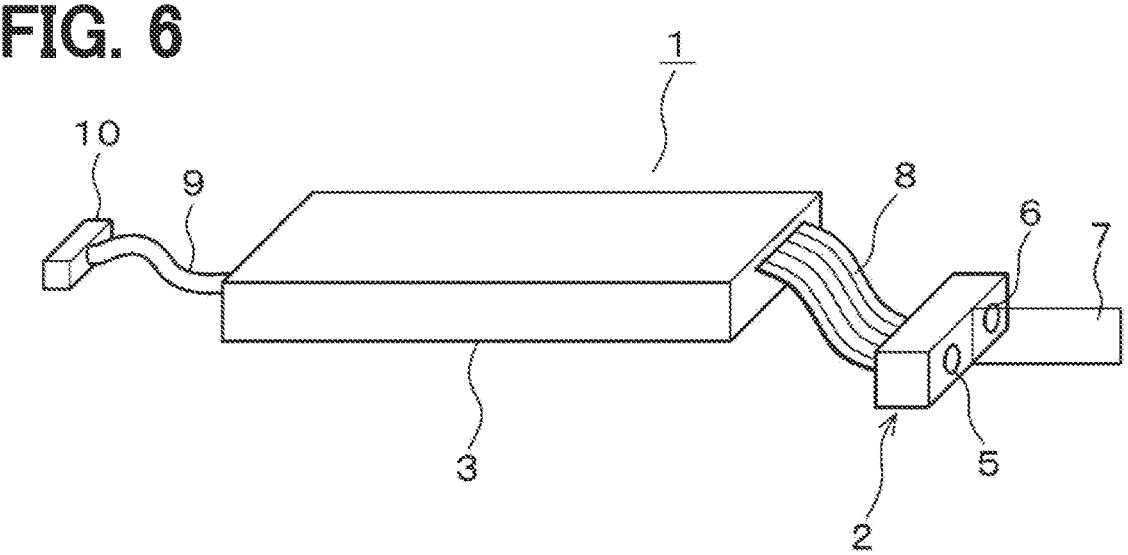
FIG. 6 is a perspective view schematically illustrating an external configuration of an occupant monitoring system.
Figure 7:
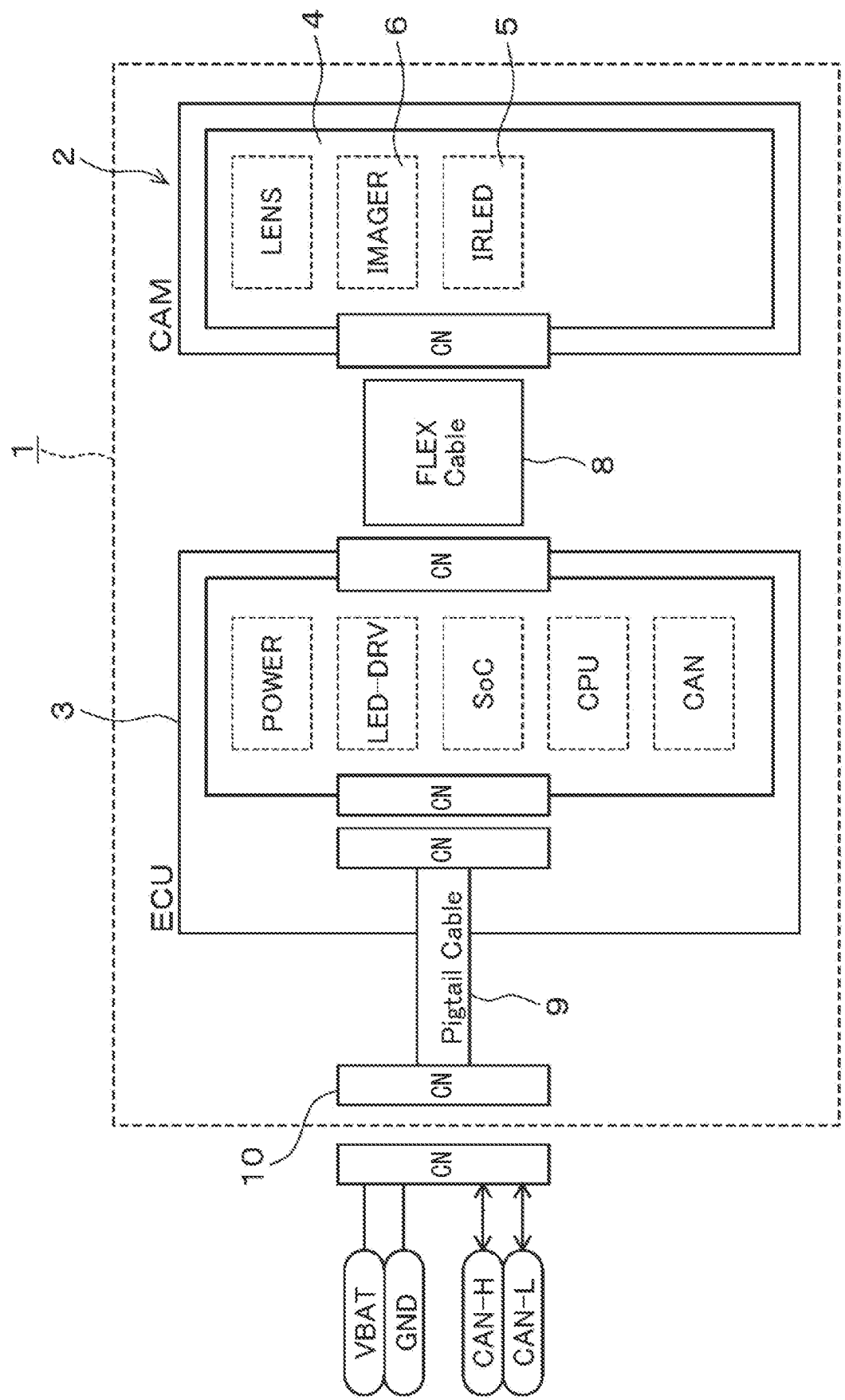
FIG. 7 is a block diagram schematically illustrating an electrical configuration of the occupant monitoring system.

A first embodiment will be described with reference to FIGS. 1 to 7. FIGS. 6 and 7 schematically show an overall configuration of an occupant monitoring system 1 according to the present embodiment. The occupant monitoring system 1 includes a camera unit 2 and an image processing ECU 3 as an image processor.

The camera unit 2 includes an LED 5 as a light source and a camera 6 on a substrate 4. For example, an IRLED that outputs infrared light as illumination light is adopted as the LED 5, and an infrared camera is adopted as the camera 6. The camera unit 2 is configured to radiate infrared light from the LED 5 toward the face of the occupant, and receives the reflected light by the camera 6 so as to image the face of a driver D (see FIG. 1). Details of the camera unit 2 will be described later.

Although not described in detail, the image processing ECU 3 mainly includes a computer having a CPU and peripheral devices thereof, and controls the LED 5 and the camera 6. The image processing ECU 3 further conducts the image processing and the image recognition of data captured by the camera 6. In the image recognition processing, the face of the driver D is detected, and parts of the face are detected based on the feature points. Further, the orientation of the face and the eye open state, and the like are detected. The image processing ECU 3 and the camera unit 2 are housed in, for example, an instrument panel 15 (see FIG. 3) of the vehicle cabin R.

As shown in FIG. 6, the image processing ECU 3 is unitized and connected to the camera unit 2 via a flexible cable 8 and a connector. The image processing ECU 3 is connected to a power supply, a ground, an in-vehicle network, and the like via a cable 9, a connector 10, and the like. In this way, the data of the face recognition of the driver D recognized by the occupant monitoring system 1 is used for a driving support process or the like.

Figure 2:
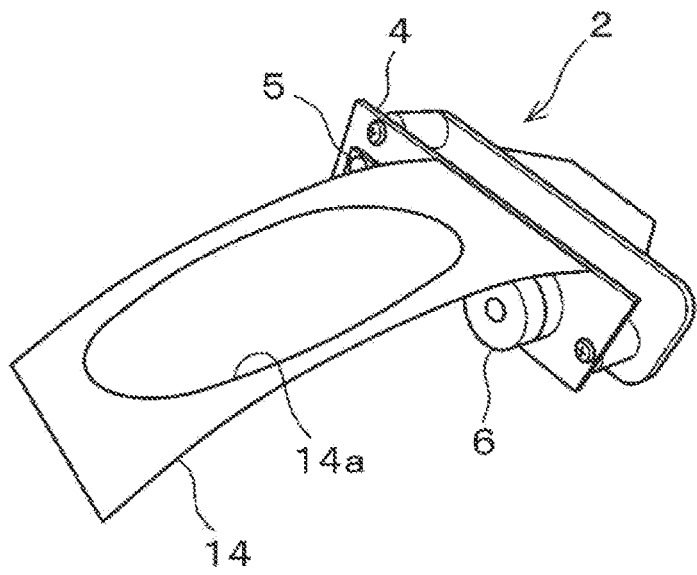
FIG. 2 is a perspective view illustrating the camera unit.
Figure 3:
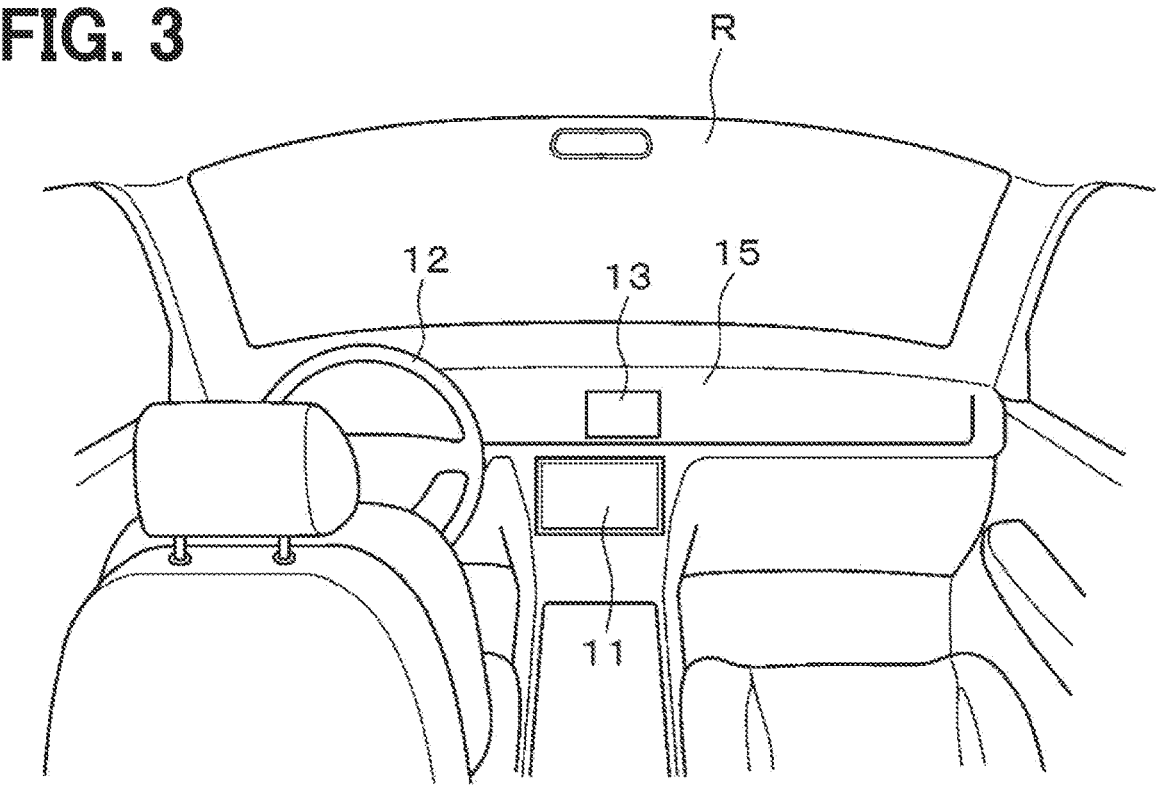
FIG. 3 is a front view of an instrument panel in a vehicle cabin.

The camera unit 2 will be described with reference to FIGS. 1 to 4. As shown in FIGS. 1 and 2, the camera unit 2 includes the LED 5 and the camera 6 arranged side by side in the left and right direction, on the front side of the substrate 4. The camera unit 2 includes a light shielding wall 7 that partitions the LED 5 and the camera 6 from each other. The camera unit 2 is provided in the instrument panel 15. As shown in FIG. 3, a center display 11, which is positioned at the center and on which various screens such as a navigation screen are displayed, is provided on the design surface on the front surface of the instrument panel 15. A driver's seat is provided on the left side in the vehicle cabin R, and a steering wheel 12 is provided in front of the driver's seat.

The instrument panel 15 has a monitor window 13 positioned above the center display 11. The monitor window 13 is configured such that a design surface of the instrument panel 15 is opened in a slightly horizontally long rectangular shape, and an IR filter that mainly transmits infrared light is disposed in the opening portion. As shown in FIG. 1, the camera unit 2 is disposed at a slightly distant position behind the monitor window 13 so as to face slightly obliquely forward so that the face of the driver D can be photographed through the monitor window 13.

In the camera unit 2, when the LED 5 is turned on, the infrared light is output forward as illumination light, and the illumination light is emitted toward the face of the driver D on the driver's seat through the monitor window 13. The reflected light is input to the camera 6 through the monitor window 13. Image data of the face of the driver D captured by the camera 6 is input to the image processing ECU 3, and recognition processing of the face of the driver D is performed.

The occupant monitoring system 1 of the present embodiment includes an exclusion structure that excludes a region in which an obstacle that may be erroneously recognized as the face of the driver D is present from the imaging view V of the camera 6 or the imaging data. In the present embodiment, as shown in FIGS. 1 and 2, the exclusion structure includes a shielding member that physically blocks a part of the imaging view V (see FIG. 4) of the camera 6. More specifically, the shielding member includes a light shielding plate 14 having a window portion 14a that transmits light only for the existence range V0 of the face of the driver D in the imaging view V of the camera 6. In the present embodiment, the light shielding plate 14 serving as a shielding member is provided in the camera unit 2.

The light shielding plate 14 is formed of a thin plate-like or sheet-like member colored in black or the like that hardly reflects light, and is formed to have, for example, a quadrangular shape as a whole. The light shielding plate 14 has the window portion 14a formed as, for example, an elliptical hole on an inner side thereof. The window portion 14a can be configured in various ordinary shapes such as a circle and a quadrangle in addition to the elliptical shape. The light shielding plate 14 is disposed in front of the camera 6. Accordingly, as shown in FIG. 4, in the imaging view V of the camera 6, the existence range V0 is left in an elliptical shape corresponding to the window portion 14a in the central portion where the face of the driver D appears, and the other portions are shielded. Examples of the obstacle that may be erroneously recognized as the face of the occupant include interior parts such as a steering wheel and lights, a metal fitting of a seat belt, an ornament installed by the occupant, particularly a round ornament, and the face of a child leaning from the rear seat toward the driver's seat.

Next, the operation of the occupant monitoring system 1 according to the present embodiment will be described with reference to FIG. 5. The flowchart of FIG. 5 schematically illustrates a procedure of image recognition processing for the driver D in the occupant monitoring system 1. In S1, the image processing ECU 3 performs illumination control of the LED 5 of the camera unit 2 and imaging control of the camera 6. In S2, imaging of the face of the driver D is performed. In S3, the face of the driver D is detected from the imaging data of the camera 6.

When the face detection of the driver D succeeds, in S4, the feature points of the face, in this case, both eyes and a mouth are detected. In S5, the orientation of the face of the driver D and the position of the head of the driver D are detected. In S6, the line of sight of the driver D and the eye opening of the driver D are detected. The above processing is repeatedly executed at all times while the vehicle is traveling, and the data of the face recognition of the driver recognized by the occupant monitoring system 1 is used for the driving support processing and the like.

If the face of a person is determined based on the detection of the feature points such as the eyes and the mouth as described above, there is a possibility that an object other than the face is erroneously determined as the face of the person. For example, the steering wheel 12 is present in front of the face of the driver D. There is a possibility that the hand of the driver D is determined to be a face, depending on the distance between the fingers of the hand of the driver D gripping the steering wheel 12, the projections or the gaps of the joints of the hand, and the size of the fist, which may look like a human face.

In contrast, in the present embodiment, an exclusion structure is provided for excluding, from the imaging view V of the camera 6, a region in which there is an obstacle that may be erroneously recognized as the face of a person around the face of the driver D. In this case, as illustrated in FIG. 4, as an exclusion structure, a region in which an obstacle that may be erroneously recognized as the face of a part of the occupants exists in the imaging view V of the camera 6 is physically blocked by the light shielding plate 14 as a shielding member. Only the elliptical region V0 corresponding to the window portion 14a of the light shielding plate 14 is subjected to image processing. As a result, only the peripheral portion of the driver D is left in the image data, and the portion including the steering wheel 12 on the outer side of the peripheral portion is trimmed, so that there is no possibility of erroneous recognition in which an object other than the face of the driver D is determined as the face.

As described above, according to the occupant monitoring system 1 of the present embodiment, an image of the face of the driver D as an occupant is captured by the camera 6, and the face of the driver D is recognized from the captured image data. The occupant monitoring system 1 includes the exclusion structure that excludes, from the imaging view V of the camera 6, a region in which an obstacle that may be erroneously recognized as the face of the driver D is present. Accordingly, it is possible to effectively restrict erroneous recognition in which an object other than the face of the driver D is determined as the face.

In the present embodiment, as the exclusion structure, the camera unit 2 has the light shielding plate 14 as a shielding member that physically blocks a part of the imaging view V of the camera 6. Accordingly, in the imaging view V of the camera 6, a region where an obstacle that may be erroneously recognized as the face of a part of the occupant exists is physically blocked by the light shielding plate 14, thereby restricting erroneous recognition. Therefore, the exclusion structure can be effectively realized with a relatively simple configuration in which the light shielding plate 14 is provided in the camera unit 2.

Second Embodiment

Figure 8:
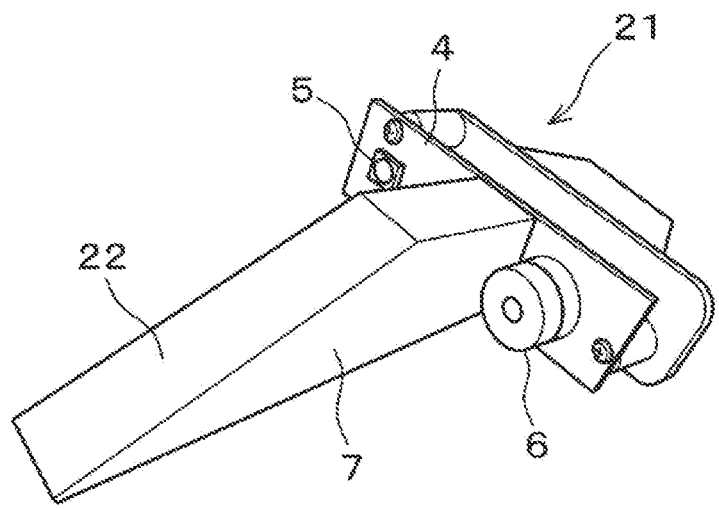
FIG. 8 is a perspective view illustrating a camera unit according to a second embodiment.
Figure 9:
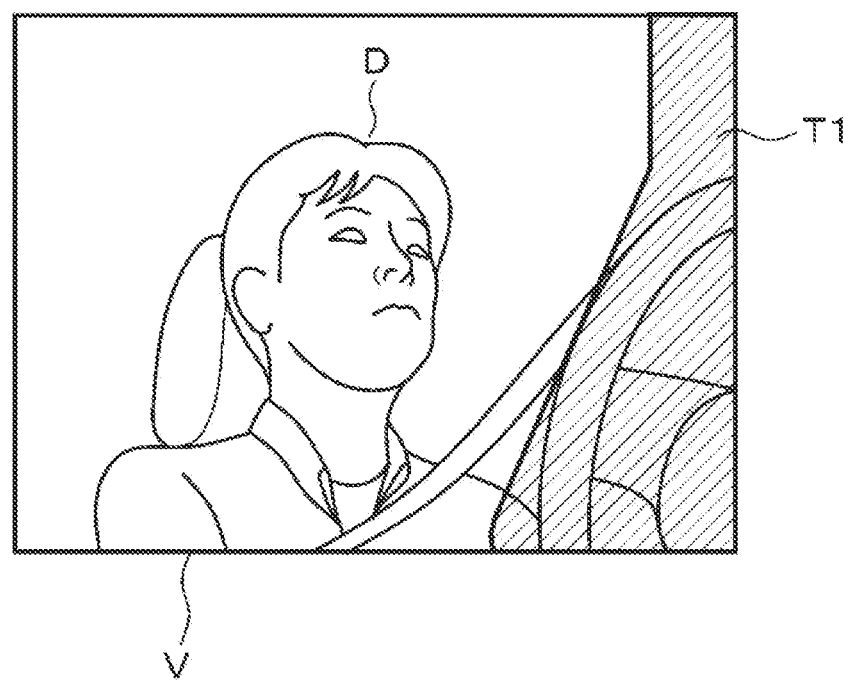
FIG. 9 is a diagram illustrating an example of imaging by a camera.

FIG. 8 and FIG. 9 show a second embodiment. In the second embodiment, as shown in FIG. 8, the shape of a light shielding plate 22 serving as a shielding member provided in the camera unit 21 is different from that of the first embodiment. As in the first embodiment, the camera unit 21 has the LED 5 and the camera 6 arranged side by side in the left and right direction, on the front side of the substrate 4. The light shielding plate 22 is provided along the light shielding wall 7. The light shielding plate 22 serving as a shielding member is configured in a shape that physically blocks and shields a part of the imaging view V of the camera 6. Further, the light shielding plate 22 physically blocks and shields a right region T1 of the imaging view V, as shown in FIG. 9, in which the steering wheel 12 is present, as the exclusion structure.

Also in the second embodiment, similarly to the first embodiment, the face of the driver D as the occupant is imaged by the camera 6 and the face of the driver D is recognized from the imaging data. It is possible to effectively restrict erroneous recognition in which an object other than the face of the driver D is determined as the face. In addition, the exclusion structure can be effectively realized with a relatively simple configuration in which the light shielding plate 22 is provided in the camera unit 21.

Third Embodiment

Figure 10:
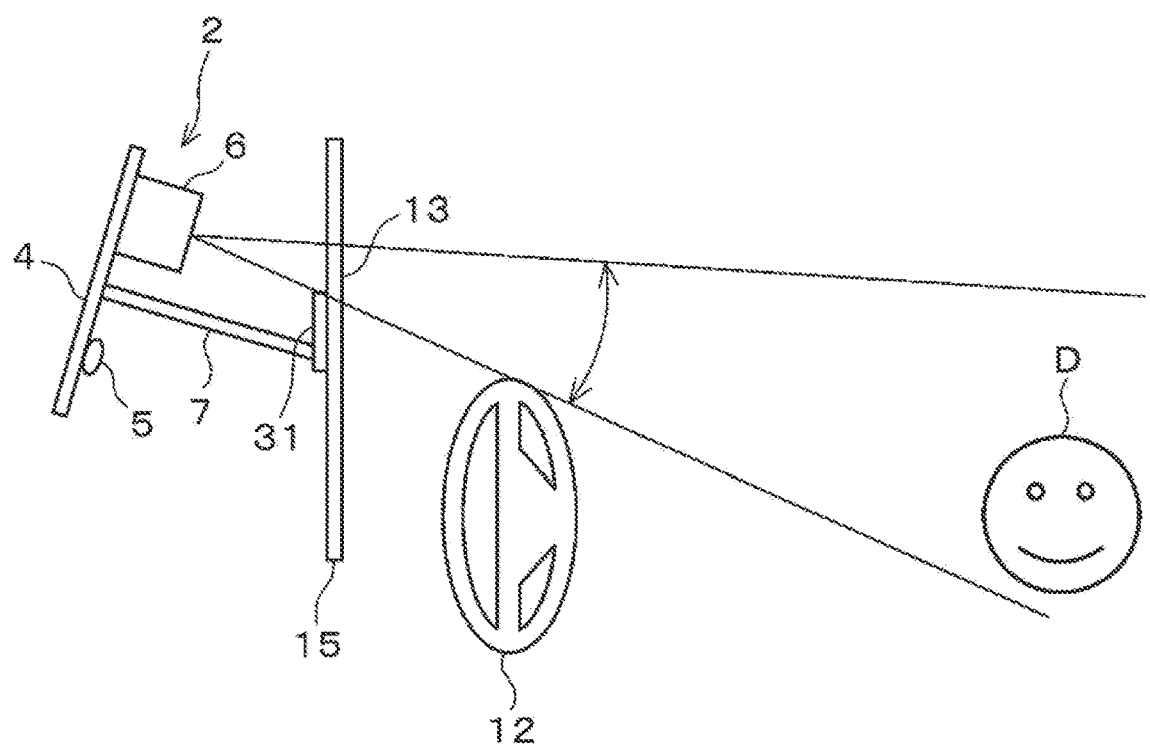
FIG. 10 is a plan view illustrating a camera unit according to a third embodiment.
Figure 11:
FIG. 11 is a diagram illustrating an example of imaging by a camera.

FIG. 10 and FIG. 11 show a third embodiment. In the third embodiment, as illustrated in FIG. 10, an exclusion structure is provided to exclude a region T2, where an obstacle that may be erroneously recognized as the face of the driver D as the occupant is present, from the imaging view V of the camera 6. The exclusion structure includes the light shielding plate 31 as a shielding member provided on the back side of the monitor window 13 of the instrument panel 15 in the vehicle cabin R. As shown in FIG. 11, the light shielding plate 31 is configured in a thin plate shape having a vertically long rectangular shape, and is configured to physically close the region T2 including the steering wheel 12 on the right side in the imaging view V of the camera 6.

According to the third embodiment, the face of the driver D as the occupant is imaged by the camera 6 and the face of the driver D is recognized from the imaging data. In the imaging view V of the camera 6, the region T2 in which an obstacle that may be erroneously recognized as a part of the face of the driver D exists is physically closed by the light shielding plate 31 as the shielding member. Accordingly, it is possible to effectively restrict erroneous recognition in which an object other than the face of the driver D is determined as the face. Therefore, the exclusion structure can be effectively realized with a relatively simple configuration in which the light shielding plate 31 is provided in the vehicle cabin R.

Fourth Embodiment

Figure 12:
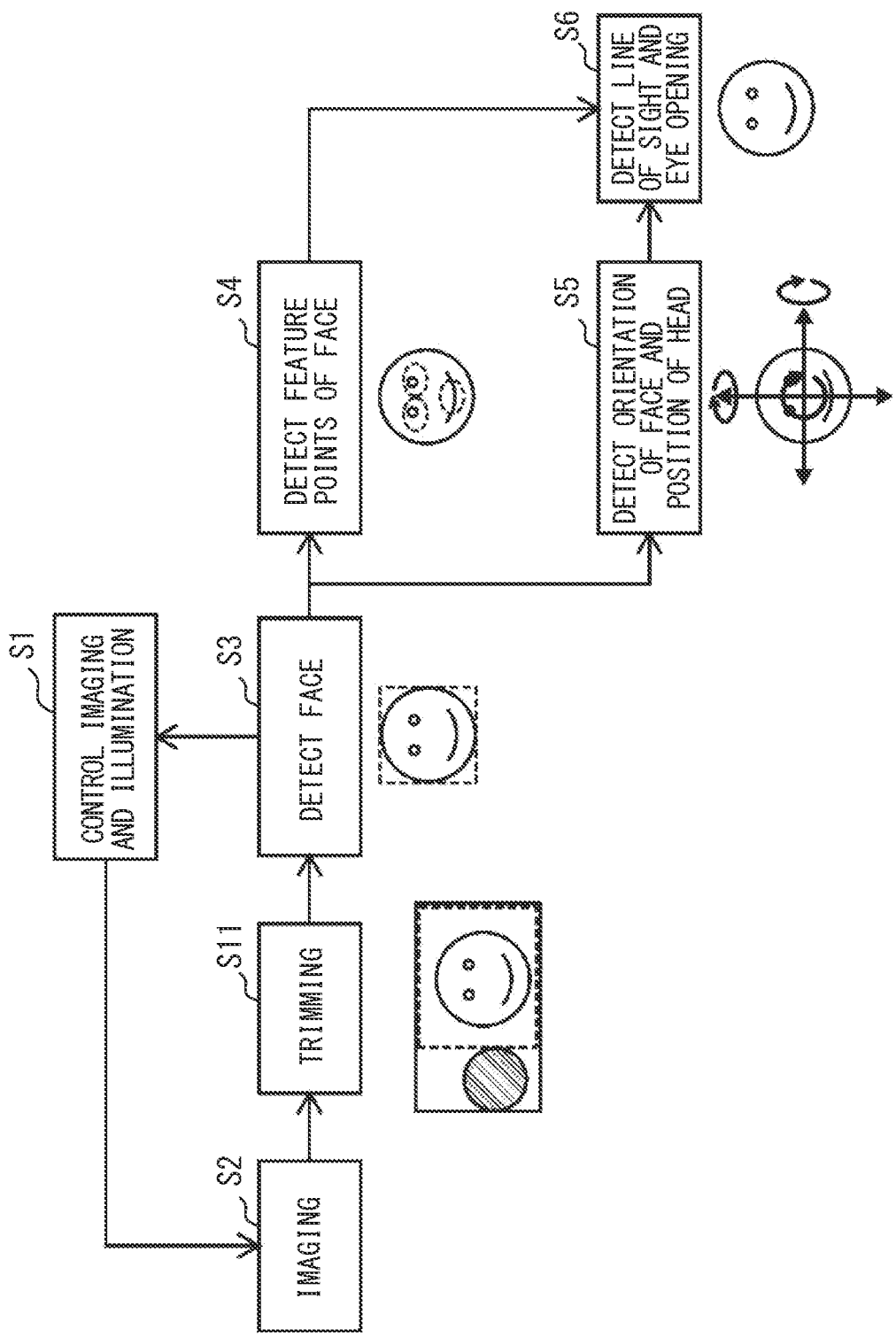
FIG. 12 is a flowchart illustrating a procedure of image recognition according to a fourth embodiment.
Figure 13:
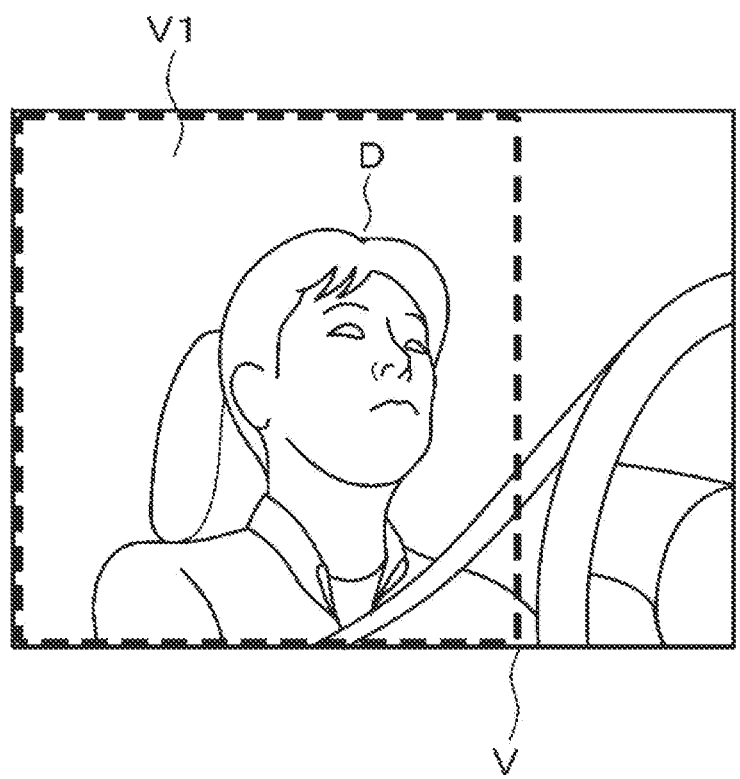
FIG. 13 is a diagram illustrating an example of imaging by a camera.

FIG. 12 and FIG. 13 show a fourth embodiment. The fourth embodiment is different from the first to third embodiments in which a shielding member is used. In the present embodiment, as an exclusion structure for excluding a region where an obstacle that may be erroneously recognized as the face of the driver D as an occupant is present, an image recognition is performed by excluding a part of the captured data from the captured data by the camera 6 by a software configuration in the image processing ECU 3.

The flowchart of FIG. 12 schematically illustrates a procedure of image recognition processing for the driver D in the occupant monitoring system 1. In S1, the image processing ECU 3 performs illumination control of the LED 5 of the camera unit 2 and imaging control of the camera 6. In S2, imaging of the face of the driver D is performed. Then, in S11, trimming is performed on the image of the camera 6 with respect to a region where there is an obstacle that may be erroneously recognized as the face of the driver D. For example, as illustrated in FIG. 13, the right side region including the steering wheel 12 is excluded, and only the region V1 indicated by a thick broken line in the drawing is a target of image processing.

Thereafter, in S3, the face of the driver D is detected from the imaging data of the camera 6. When the face detection of the driver D succeeds, in S4, the feature points of the face, in this case, both eyes and a mouth are detected. In S5, the orientation of the face of the driver D and the position of the head of the driver D are detected. In S6, the line of sight of the driver D and the eye opening of the driver D are detected.

According to the fourth embodiment, the camera 6 captures an image of the face of the driver D as an occupant and recognizes the face of the driver D from the captured image data. The exclusion structure is provided to exclude, by software, a region in which an obstacle that may be erroneously recognized as the face of the driver D exists from the captured image data of the camera 6. Accordingly, it is possible to effectively restrict erroneous recognition in which an object other than the face of the driver D is determined as the face. In this case, the exclusion structure can be easily realized by a software configuration, which is effective.

Other Embodiment

In each of the embodiments, the driver is detected as the occupant. However, the occupant is not limited to the driver, and the occupant may be seated on the front passenger seat or the rear seat. In each of the embodiments, the camera unit is provided at the center of the instrument panel. However, the camera unit may be provided at an appropriate position in the vehicle cabin, for example, at another position of the instrument panel or at a meter in front of the driver's seat. Further, in each of the embodiments, the camera and the light source are configured as a camera unit, but the camera and the light source may be separately attached.

Although the present disclosure has been described in accordance with the examples, it is understood that the present disclosure is not limited to such examples or structures. The present disclosure encompasses various modifications and variations within the scope of equivalents. Furthermore, various combinations and formations, and other combinations and formations including one, more than one or less than one element may be included in the scope and the spirit of the present disclosure.

The control unit and method described in the present disclosure may be implemented by a special purpose computer provided by configuring a memory and a processor programmed to execute one or more functions embodied by a computer program. Alternatively, the control unit described in the present disclosure and the method thereof may be realized by a dedicated computer configured as a processor with one or more dedicated hardware logic circuits. Alternatively, the control unit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. An occupant monitoring system comprising:
   a camera provided in a cabin to capture an image of a face of an occupant in a vehicle;
   an image processor configured to recognize the face of the occupant based on an imaging data captured by the camera; and
   an exclusion structure configured to exclude, from a field of view of the camera or the imaging data, a region contains an obstacle to be erroneously recognized as the face of the occupant, wherein
   the exclusion structure includes a shielding member that physically blocks a part of an imaging view of the camera, and
   the shielding member is positioned in a camera unit that houses the camera.

2. The occupant monitoring system according to claim 1, wherein the shielding member includes a light shielding plate having a window portion that transmits light only for an existence range of the face of the occupant in an imaging view of the camera.

3. The occupant monitoring system according to claim 1, wherein the shielding member includes a light shielding plate that shields a fixed object including a steering wheel in an imaging view of the camera.

4. An occupant monitoring system comprising:
   a camera provided in a cabin to capture an image of a face of an occupant in a vehicle;
   an image processor configured to recognize the face of the occupant based on an imaging data captured by the camera; and
   an exclusion structure configured to exclude, from a field of view of the camera or the imaging data, a region contains an obstacle to be erroneously recognized as the face of the occupant, wherein
   the exclusion structure includes a shielding member that physically blocks a part of an imaging view of the camera, and
   the shielding member is positioned in the cabin.

5. The occupant monitoring system according to claim 4, wherein the shielding member includes a light shielding plate having a window portion that transmits light only for an existence range of the face of the occupant in an imaging view of the camera.

6. The occupant monitoring system according to claim 4, wherein the shielding member includes a light shielding plate that shields a fixed object including a steering wheel in an imaging view of the camera.

* * * * *